UNITED STATES PATENT OFFICE.

THOMAS HENRY GRAY, OF BROOKLYN, NEW YORK, ASSIGNOR OF ONE-TENTH TO JOHN LEAVENS, OF SAME PLACE.

REMOVING OLEINE FROM LINSEED-OIL.

SPECIFICATION forming part of Letters Patent No. 295,633, dated March 25, 1884.

Application filed September 17, 1881. (No specimens.) Patented in England July 9, 1880, No. 2,831.

*To all whom it may concern:*

Be it known that I, THOMAS HENRY GRAY, of Brooklyn, Eastern District, in the county of Kings and State of New York, have invented a new and useful Improvement in Removing Oleine from Linseed-Oil, of which the following is a full, clear, and exact description.

The object of my invention is to prepare linseed-oil for use with gums to form varnishes, so that it will not separate under heat. The objection to it for use with gums and for forming linoleum, leather, japanners', and printers' ink varnishes is that it must be subject to a heat of 400° or 500° Fahrenheit, when the heavier and lighter parts of the oil separate, causing a serious loss, and making the varnish nearly black. Now, my process has the effect of firmly uniting the lighter and heavier parts of linseed-oil, so that heat will not separate them when being united with the gums to form varnishes. This I accomplish by mixing the oil with a solution of common salt before uniting it with the gums, as hereinafter described.

In carrying my invention into practical effect, I take one ton of linseed-oil, as it is ordinarily met with in commerce, and whether refined or not, and place it in a tank, which may be heated by a jacket of steam or otherwise. The oil is kept at a temperature of about one hundred and ten degrees (110°) Fahrenheit, and is agitated from time to time by means of beaters or other suitable means, to facilitate the uniform heating of the oil. New linseed-oil should be kept in agitation during the whole of the working-hours of the day—say ten out of the twenty-four—and the treatment should be continued for some nine days. When old oil is treated, the agitation should be kept up for a longer period—say fourteen days. The heated oil should be tested from time to time with a saline solution, hereinafter described, for a precipitate, and when this is obtained the saline solution should be added to the oil in the tank, and the oil should be agitated to thoroughly mix the oil and solution for about two hours, at which time the precipitation of the oleine will commence. When the precipitation is completed, which will be in about twenty-four hours, the deposit, together with the saline solution, is drawn off from the bottom of the tank, leaving the clear oil in the tank. The oil is then washed with pure water and agitated for about one hour, when a second deposit will be obtained, which is in like manner removed.

An effective saline solution can be prepared by dissolving ninety pounds of common salt in sixty gallons of water for each ton of oil to be treated. To brighten the oil after being washed, it is heated to about two hundred degrees, which drives off the water left in the oil by the washing operation.

The purified oil obtained from new oil is applicable wherever linseed-oil is used. Preference, however, is given to that obtained from old oil for mixing with melted hard gums—such as copal—in making varnishes.

Instead of using mechanical agitation, heat can be advantageously employed for effecting the same result, in which case the saline solution is mixed with the oil at the outset, and the mixture is subjected to a heat sufficient to boil it. This heat is kept up for about twenty-four hours, and the precipitation of the oleine will take place on cooling the tank. The oleine and the saline solution are then run off together, and the oil and the oleine are treated in the manner hereinbefore described to fit them for market. For this mode of applying the saline solution about three pounds of common salt are dissolved in about four gallons of water for each two hundred-weight of oil.

Having thus described my invention, I claim as new and desire to secure by Letters Patent—

A process of removing oleine from linseed-oil, which consists in maintaining the oil at a temperature of 110° Fahrenheit and in a state of agitation for about ten hours a day for nine to fourteen days, then mixing therewith, while hot and in a state of agitation, a saline solution, and finally drawing off the saline and oleine precipitate, and washing the purified oil with pure water until a further precipitate is obtained, as described.

THOMAS HENRY GRAY.

Witnesses:
JAMES T. GRAHAM,
C. SEDGWICK.